United States Patent
Oh et al.

(10) Patent No.: US 8,040,232 B2
(45) Date of Patent: Oct. 18, 2011

(54) USN MIDDLEWARE APPARATUS AND METHOD FOR GENERATING INFORMATION BASED ON DATA FROM HETEROGENEOUS SENSOR NETWORKS AND INFORMATION SERVICE PROVIDING SYSTEM USING THE SAME

(75) Inventors: Se-Won Oh, Daejon (KR); Yong-Joon Lee, Daejon (KR); Jong-Hyun Park, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 297 days.

(21) Appl. No.: 12/439,421

(22) PCT Filed: Dec. 26, 2006

(86) PCT No.: PCT/KR2006/005715
§ 371 (c)(1),
(2), (4) Date: Feb. 27, 2009

(87) PCT Pub. No.: WO2008/026804
PCT Pub. Date: Mar. 6, 2008

(65) Prior Publication Data
US 2010/0007483 A1    Jan. 14, 2010

(30) Foreign Application Priority Data
Sep. 1, 2006 (KR) .................. 10-2006-0084353

(51) Int. Cl.
*G08B 19/00* (2006.01)
(52) U.S. Cl. ........ 340/521; 340/523; 340/524; 340/534; 340/539.26; 340/540; 340/541; 340/286.02; 709/218; 709/223; 709/224; 709/201; 709/206
(58) Field of Classification Search .................. 340/521, 340/523, 524, 534, 539.26, 540, 541, 286.02; 709/218, 223, 224, 201, 206
See application file for complete search history.

(56) References Cited

U.S. PATENT DOCUMENTS 5,870,605 A    2/1999    Bracho et al.
(Continued)

FOREIGN PATENT DOCUMENTS

| EP | 1545069 A1 | 6/2005 |
|----|------------|--------|
| JP | 03-274939 | 12/1991 |
| JP | 2000-047894 | 2/2000 |

(Continued)

OTHER PUBLICATIONS

Dae-Young Kim, et al. (Real-Time Embedded System Laboratory, Information & Communication College of Korea), "Technical Trend of Sensor Network Operating System/Middleware", *ITFIND*, Issue 1221, Nov. 9, 2005, 10pp.

*Primary Examiner* — Tai T Nguyen
(74) *Attorney, Agent, or Firm* — Staas & Halsey LLP

(57) ABSTRACT

Provided are a Ubiquitous Sensor Network (USN) middleware apparatus and method for generating an information service based on heterogeneous sensor networks and a system for providing the information service using the same. In the system, a sensor node constructing a sensor network senses environment information, and a sensor network data transmitter collects sensed data sensed by the sensor node in real-time and transmits the collected sensed data in a message form. A USN middleware extracts object and environment information by cleaning, classifying and integrating the message received from the sensor network data transmitter, generates conditional events and context aware information from the extracted object and environment information, and provides the information service to an application program, the application program providing a user with information related to environment where the sensor network observes.

12 Claims, 4 Drawing Sheets

U.S. PATENT DOCUMENTS

| | | |
|---|---|---|
| 6,801,943 B1 | 10/2004 | Pavan et al. |
| 7,825,791 B2 * | 11/2010 | Kim et al. .................... 340/500 |
| 2005/0114493 A1 | 5/2005 | Mandato et al. |
| 2006/0095518 A1 | 5/2006 | Davis et al. |
| 2006/0149905 A1 | 7/2006 | Park et al. |
| 2008/0267101 A1 * | 10/2008 | Webb et al. ................... 370/310 |
| 2009/0006522 A1 * | 1/2009 | Kim et al. .................... 709/201 |

FOREIGN PATENT DOCUMENTS

| | | |
|---|---|---|
| KR | 10-2001-0020018 | 3/2001 |
| KR | 10-0372788 B1 | 2/2003 |
| KR | 10-2004-0108623 | 12/2004 |
| KR | 10-2006-0009788 | 2/2006 |
| KR | 10-2006-0068518 | 6/2006 |
| WO | 2006/065098 A1 | 6/2006 |

* cited by examiner

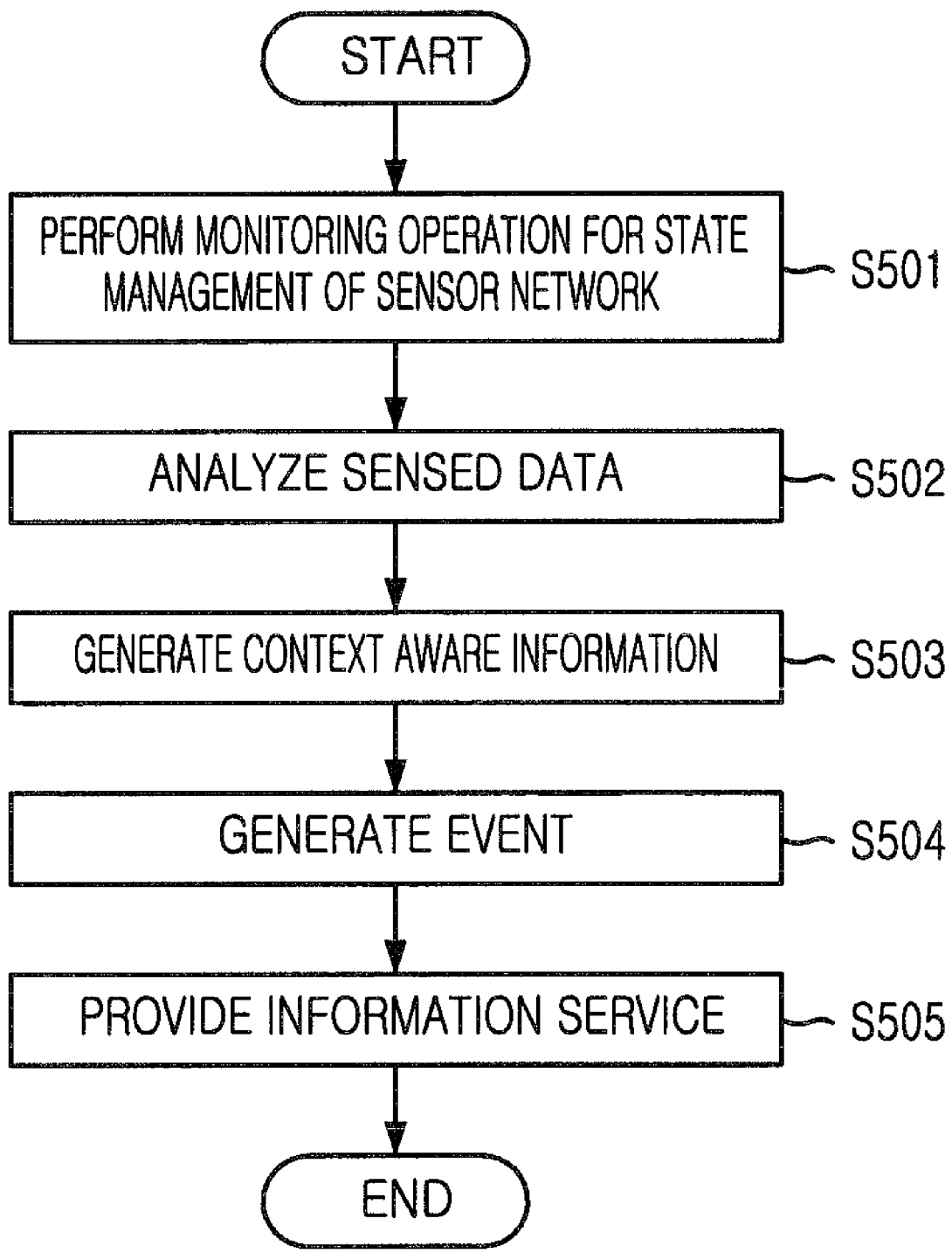

USN MIDDLEWARE APPARATUS AND METHOD FOR GENERATING INFORMATION BASED ON DATA FROM HETEROGENEOUS SENSOR NETWORKS AND INFORMATION SERVICE PROVIDING SYSTEM USING THE SAME

CROSS REFERENCE TO RELATED APPLICATIONS

This application claims the benefit under 35 U.S.C. Section 371, of International Application No. PCT/KR2006/005715, filed Dec. 26, 2006, which claimed priority to Korean Application No. 10-2006-0084353, filed Sep. 1, 2006 in the Korean Intellectual Property Office, the disclosures of all of which are hereby incorporated by reference.

TECHNICAL FIELD

The present invention relates to a Ubiquitous Sensor network (USN) middleware apparatus and method for generating information based on data transmitted from heterogeneous sensor networks and a system for providing the information service using the same; and, more particularly, to a USN middleware apparatus for collecting sensed data from sensor nodes of heterogeneous sensor networks, analyzing and processing sensed data, e.g., temperature, humidity, pressure, motion, and acceleration, generating events and context aware information, and providing the information to users through an application program, a method thereof, and an information service providing system employing the same.

BACKGROUND ART

When data sensed through sensor networks are used, an application program must directly process and integrate the sensed data in order to provide information to a user using a specific sensor network. This way requires a lot of manpower and is cost-consuming. In addition, as the number and kinds of sensor networks required for generating an information service increase, the application program must be modified and enlarged to meet a processing capability requirement with respect to a communication scheme, control protocol, functional features, and sensed data processing scheme of each sensor network. Furthermore, when the sensed data collected from the same sensor network is simultaneously used in one or more application programs, the control and communication cost of gateways and sensor networks increases, resulting in performance degradation of the sensor networks and reduction of power resources.

In Ubiquitous Sensor Network (USN) environment, a plurality of sensor networks having different purposes and functions are expected to be installed or distributed in a wide area. Sensor nodes of each sensor network collect environment information in real-time while they are attached to objects, placed in a position, or in motion.

In order for the application program to provide useful information service to the user, there is a need for a means that can abstract one or more heterogeneous sensor networks, generate events and context aware information by analyzing sensed data from a corresponding sensor network, and provide the generated information to the application rapidly and conveniently. However, such a means does not exist at present.

DISCLOSURE

Technical Problem

It is, therefore, an objective of the present invention to provide a Ubiquitous Sensor Network (USN) middleware apparatus for collecting sensed data from sensor nodes of heterogeneous sensor networks, analyzing and processing sensed data, e.g., temperature, humidity, pressure, motion, and acceleration, generating events and context aware information, and providing the information to users through an application program, a method thereof, and an information service providing system employing the same.

Technical Solution

In accordance with one aspect of the present invention, there is provided a system for offering an information service based on heterogeneous sensor networks, including: a sensor node constructing a sensor network to sense its ambient environment; a sensor network data transmitter for collecting sensed data sensed by the sensor nodes in real-time and transmitting the collected sensed data in a message form; and a Ubiquitous Sensor Network (USN) middleware for extracting object and environment information by cleaning, classifying and integrating the message received from the sensor network data transmitter, generating conditional events, context aware information, circumstantial analysis information, and the other relevant knowledge contents from the extracted object and environment information, and providing the information service to an application program, the application program providing a user with information related to environment where the sensor network observes or is installed.

In accordance with another aspect of the present invention, there is provided a USN middleware apparatus for offering an information service based on heterogeneous sensor networks, including: a sensor network abstraction unit for extracting sensed data from a message received from a sensor network; a sensor network intelligence unit for extracting low-level information including the object properties and environment state information by performing an analysis operation to clean, classify and integrate the sensed data extracted by the sensor network abstraction unit, and generating high-level information including conditional events, context aware information, and circumstantial analysis information from the extracted low-level information; and a service platform management unit for providing the information to the application program in a form suitable for the application program.

In accordance with another aspect of the present invention, there is provided a method for generating an information service based on heterogeneous sensor networks in a USN middleware apparatus, including the steps of: a) extracting sensed data and monitoring a state management of a sensor network, based on the extracted sensed data; b) performing an analysis operation to clean, classify and integrate the extracted sensed data; c) extracting object and environment information from the analyzed sensed data, and generating context aware information and circumstantial analysis information based on the extracted object and environment information; d) generating conditional events according to a rule set by an application program; e) scheduling an operation sequence for providing an information service to the application program; and f) providing the application program with the information service obtained according to the scheduled operation sequence, the information service including conditional events, context aware information, and circumstantial analysis information.

In accordance with another aspect of the present invention, the USN middleware apparatus processes and manages a large amount of sensed data collected from the heterogeneous sensor networks between the sensor network and the application program, generates the real-time events and context aware information related to the environment condition by analyzing the collected sensed data, and provides the information service suitable for the application program. Therefore, a plurality of sensor networks can be utilized more easily in the USN environment.

In addition, the interface with a plurality of sensor networks can be supported in the present invention. Therefore, information service about a specific position can be provided by analyzing the sensed data from a corresponding sensor network, while high-level information such as context aware information and conditional events about a wide area also can be provided by analyzing the sensed data collection obtained from the relevant multiple sensor networks.

ADVANTAGEOUS EFFECTS

According to the present invention, the sensor nodes automatically collect the changing environment conditions in real-time and the operation states of the sensor networks are continuously monitored, thereby increasing the effectiveness and reliability of the information service remarkably. The data sensed by one or more heterogeneous sensor networks having sensor nodes and gateways are processed into the information service of a USN middleware apparatus, and the processed information service is effectively provided to a plurality of application programs. Therefore, utilization of the information service based on the sensor networks can be improved and the application program can be easily developed and expanded.

DESCRIPTION OF DRAWINGS

The above and other objectives and features of the present invention will become apparent from the following description of the preferred embodiments given in conjunction with the accompanying drawings, in which:

FIG. 5 is a flowchart illustrating a method for operating a USN middleware apparatus in accordance with an embodiment of the present invention.

BEST MODE FOR THE INVENTION

Other objectives and aspects of the present invention will become apparent from the following description of the embodiments with reference to the accompanying drawings, which is set forth hereinafter.

Figure 1:
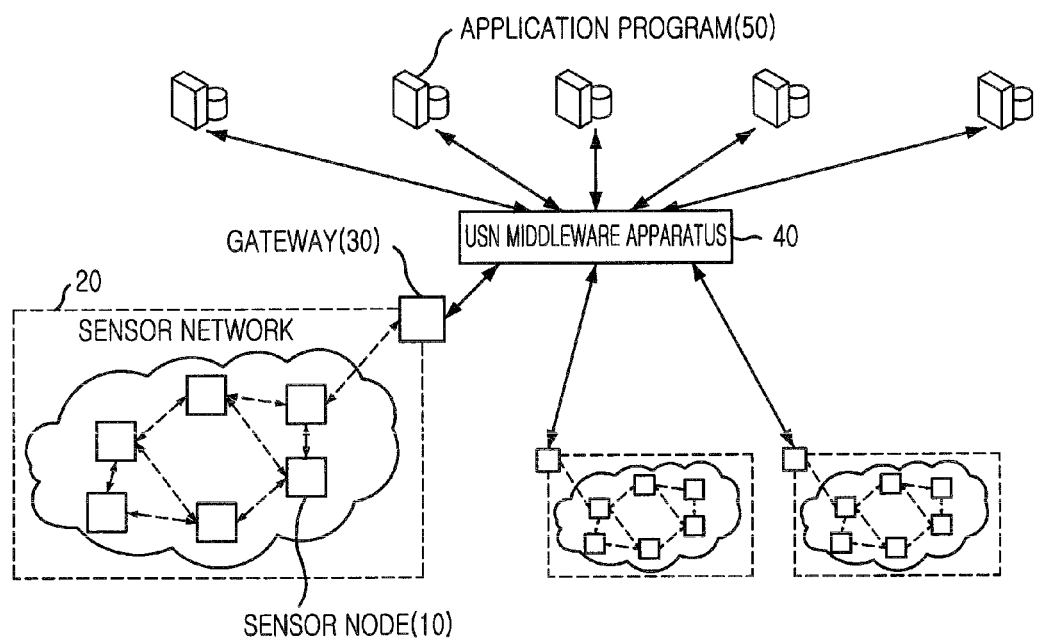
FIG. 1 illustrates a system for providing an information service based on sensed data collected from heterogeneous sensor networks in accordance with an embodiment of the present invention.

FIG. 1 illustrates a system for providing an information service based on sensed data transmitted from heterogeneous sensor networks in accordance with an embodiment of the present invention.

Referring to FIG. 1, the system for providing the information service based on the heterogeneous sensor networks in accordance with the embodiment of the present invention includes sensor nodes 10, sensor networks 20, gateways 30, a USN middleware apparatus 40, and application programs 50. The sensor nodes 10 sense environment information, and the sensor network 20 connects the sensor nodes 10 in order to wirelessly transfer data sensed at the sensor nodes 10 in real-time between the sensor nodes 10. The gateway 30 collects the data sensed by the sensor network 20 and transfers the collected data to the USN middleware apparatus 40. The USN middleware apparatus 40 stores, cleans, classifies and integrates the sensed data of the heterogeneous sensor networks 20, which are received through the gateways 30, and extracts low-level information, i.e., object properties and environment state information. Then, the USN middleware apparatus 40 provides an information service by generating high-level information, i.e., conditional events, context aware information, and circumstantial analysis information from the extracted low-level information. Using the information from the USN middleware apparatus 40 including both the low-level and high-level information, the application program provides the user with information related to the environment where the sensor network 20 observes.

The sensor nodes 10 can sense at least one of ambient temperature, ambient humidity, vibration, light, pressure, and motion. The sensor nodes 10 configure the sensor network 20 through a short-range wireless communication and the sensed data of the sensor nodes 10 are collected at the gateway 30. The gateway 30 transfers the sensed data to the USN middleware apparatus 40 through Transmission Control Protocol/Internet Protocol (TCP/IP) data transmission. Using the sensed data, the USN middleware apparatus 40 can monitor the environment observed by the sensor network 20, and control the sensor network 20. In addition, the USN middleware apparatus processes the sensed data to generate events and context aware information desired by the application program 50, and provides the information to the application program.

Figure 2:
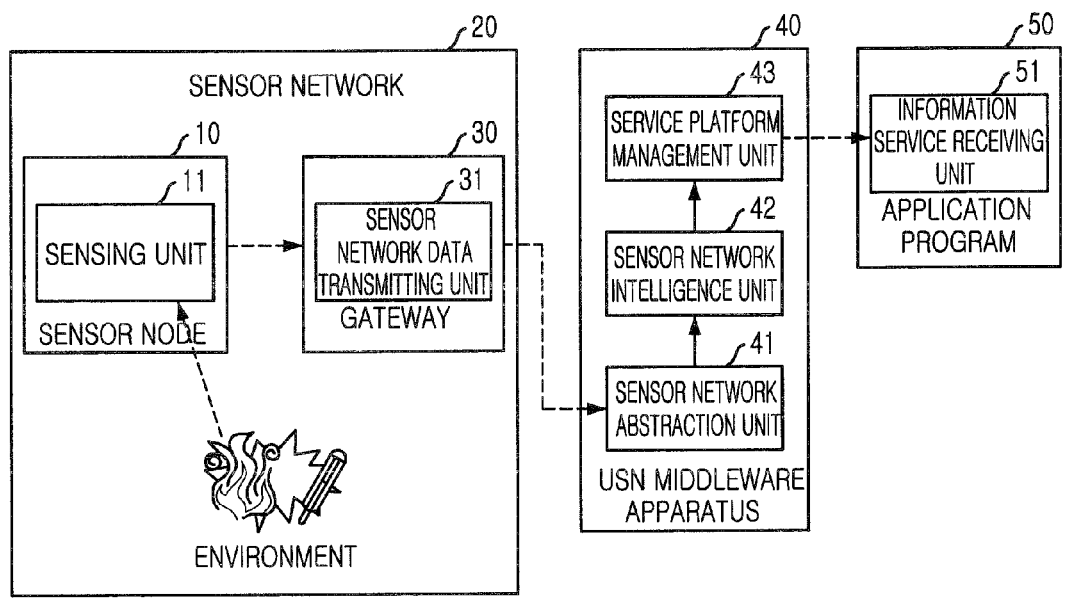
FIG. 2 is a block diagram of a system for providing an information service based on sensed data transmitted from heterogeneous sensor networks in accordance with an embodiment of the present invention.

FIG. 2 is a block diagram of the system for providing the information service based on sensed data transmitted from heterogeneous sensor networks in accordance with an embodiment of the present invention.

Referring to FIG. 2, the sensor node 10 includes a sensing unit for detecting a variety of information about environment such as temperature, humidity, heat, and infrared rays and generating sensed data.

The sensor nodes 10 are appropriately arranged, considering function and performance of the sensing units 11 and wireless communication range. At this point, it should be noted that the sensor nodes 10 must be able to transfer data to the gateway 30 through the wireless communication. In the sensor network 20, the number and the structure of the sensor nodes 10 can be divergent according to either the given environmental properties or the specific purpose of an application.

The gateway 30 includes a sensor network data transmitting unit 31 for receiving the sensed data, which are sensed in real-time by the sensing unit 11 of each sensor node 10, through the wireless communication between the sensor nodes 10 of the sensor network 20, collecting the received sensed data, and transferring the collected sensed data to the USN middleware apparatus 40 in a message form.

The USN middleware apparatus 40 includes a sensor network abstraction unit 41, a sensor network intelligence unit 42, and a service platform management unit 43. The sensor network abstraction unit 41 extracts the sensed data from the message received from the gateway 30. The sensor network intelligence unit 42 extracts the object properties and the environment state information by performing an analysis operation to clean, classify and integrate the sensed data extracted by the sensor network abstraction unit 41, and generates conditional events, context aware information, and the other knowledge contents such as circumstantial analysis information. The service platform management unit 43 provides the results processed by the sensor network intelligence unit 42 to the application program 50 in a form suitable for the application program 50. The processed results include both the extracted information including the object properties and the environment state information, and the generated information including conditional events, context aware information, and circumstantial analysis information. The service platform management unit 43 can also provide an information selection and interface function based on a plurality of heterogeneous sensor networks, which is required by the application program 50.

The application program 50 includes an information service receiving unit 51 for receiving the information from the USN middleware apparatus 40.

Hereinafter, operations of the sensor node 10, the sensor network 20, the gateway 30, the USN middleware apparatus 40, and the application program 50 will be described. The sensor node 10 transfers the data sensed in real-time by the sensing unit 11 to the gateway 30 through the wireless communication of the sensor network 20. The gateway 30 collects the sensed data received from the sensor network 20 and transfers the collected sensed data to the USN middleware apparatus 40 through the sensor network data transmitting unit 31. The sensor network abstraction unit 41 of the USN middleware apparatus 40 extracts the sensed data from the message received from the gateway 30. The sensor network intelligence unit 42 generates conditional events, context aware information, and other knowledge contents by performing an analysis operation to clean, classify and integrate the sensed data extracted by the sensor network abstraction unit 41. The service platform management unit 43 provides the results processed by the sensor network intelligence unit 42 to the information service receiving unit 51 of the application program 50 in a form suitable for the application program 50. The processed results include the object and environment information, conditional events and context aware information, and circumstantial analysis information.

In order to provide specific information required by the application program 50, the sensor network intelligence unit 42 classifies the sensed data collected by the sensor nodes 10 of the sensor network 20 and generates conditional events, i.e., notification of a specific error and alarm of crucial state, and context aware information, i.e., detection of invasion and the best position for arousing customers' interest. In order to generate more relevant information, the sensor network intelligence unit 42 may use a predetermined rule set by the application program 50. The service platform management unit 43 transfers the information to the application program 50 in a message form suitable for the application program 50.

Table 1 below shows examples of the sensed data collected by the sensor network 20, the sensed data analyzed by the USN middleware apparatus 40, and conditional events and context aware information generated by the USN middleware apparatus 40.

TABLE 1

| Classification | Analysis of sensed data and generation of information | Description |
|---|---|---|
| Sensed data #1 collected by sensor network for an hour | 15, 15, 14, 14, 12, 11 | Temperature (° C.) collected every 10 minutes |
| Sensed data #2 collected by sensor network for an hour | 80, 90 | Humidity (%) collected every 30 minutes |
| Sensed data analyzed by USN middleware apparatus | 13.5 | Average temperature for latest 1 hour |
| Conditional Events generated by USN middleware apparatus | Provide alarm ("low temperature: 13.5") for average temperature value | Application has already set a predetermined rule: alarm is generated to application program when average temperature for latest 1 hour is below 14° C. |
| Context aware information generated by USN middleware apparatus | Provide an imminent report about the given position ("There is high probability of problem in the heating machine; Check gas leakage or breakdown of the electricity") | USN middleware found the related rule and contents from its internal storage, as following. 1) There is high probability that problem will occur in heating facility when average temperature is below 14° C., current humidity is 80%, and it is night. 2) The latest problem occurring in the heating machine was related to the gas leakage and power supply failure. |

Figure 3:
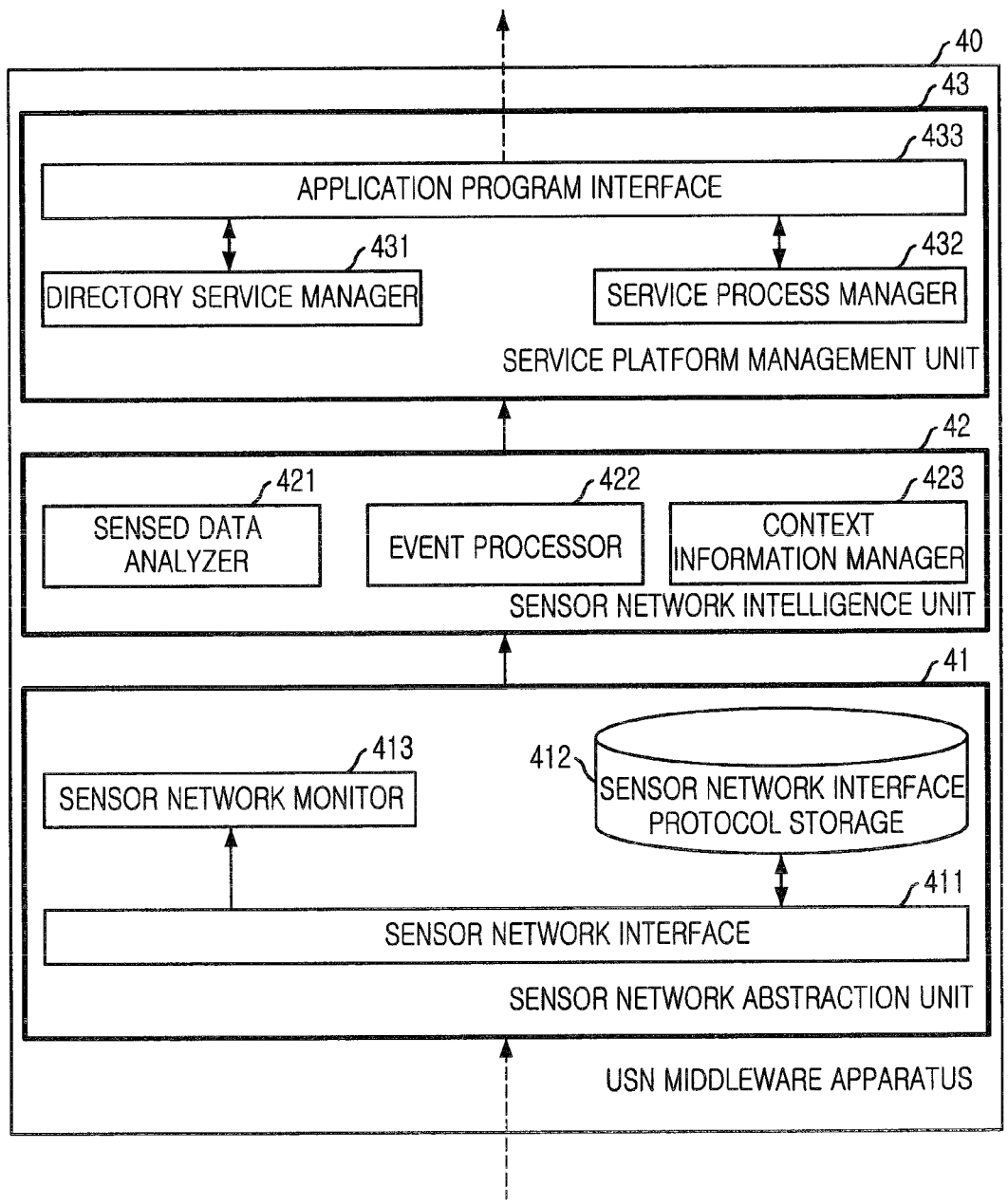
FIG. 3 is a block diagram of a Ubiquitous Sensor Network (USN) middleware apparatus in accordance with an embodiment of the present invention.

FIG. 3 is a block diagram of the USN middleware apparatus in accordance with an embodiment of the present invention.

Referring to FIG. 3, the sensor network abstraction unit 41 includes a sensor network interface 411, a sensor network interface protocol storage 412, and a sensor network monitor 413. The sensor network interface 411 extracts the sensed data by referring to a message transfer protocol, and the sensor network interface protocol storage 412 manages the message transfer protocol. The sensor network monitor 413 performs a monitoring operation for a state management of the sensor network, based on the data received from the sensor network interface 411.

The sensor network intelligence unit 42 includes a sensed data analyzer 421, an event processor 422, and a context information manager 423. The sensed data manager 421 performs an analysis operation to clean, classify and integrate the sensed data processed by the sensor network abstraction unit 41. The event processor 422 generates the events, i.e., notification and alarm about a certain condition, according to the rule set by the application program 50 and manages the generated events. The context information manager 423 senses and generates the context aware information based on the analyzed sensed data information as well as the context rule in store which are related with the object and environment.

In order to generate the events, i.e., notification and alarm about a certain condition, and the context aware information, the sensor network intelligence unit 42 may analyze only the sensed data from a single specific sensor network, or analyze a combination of sensed data from a plurality of heterogeneous sensor networks, or analyze the sensed data from the sensor network in association with predefined legacy data.

The service platform management unit 43 includes a directory service manager 431, a service process manager 432, and an application program interface 433. The directory service manager 431 identifies and searches resources of the sensor network 20. The service process manager 432 schedules and manages an operation order of the sensed data analyzer 421, the event processor 422, the context information manager 423, and the directory service manager 431. The application program interface 433 provides the application program 50 with the results processed by the sensor network monitor 413, the sensed data analyzer 421, the event processor 422, the context information manager 423, and the directory service manager 431 in the information service form suitable for the application program 50.

The service platform management unit 43 may provide the information to the application program only once, or periodically provide the information during a request period of the application program, or provide the information at a specific time point when a requirement from the application program is satisfied.

Figure 4:
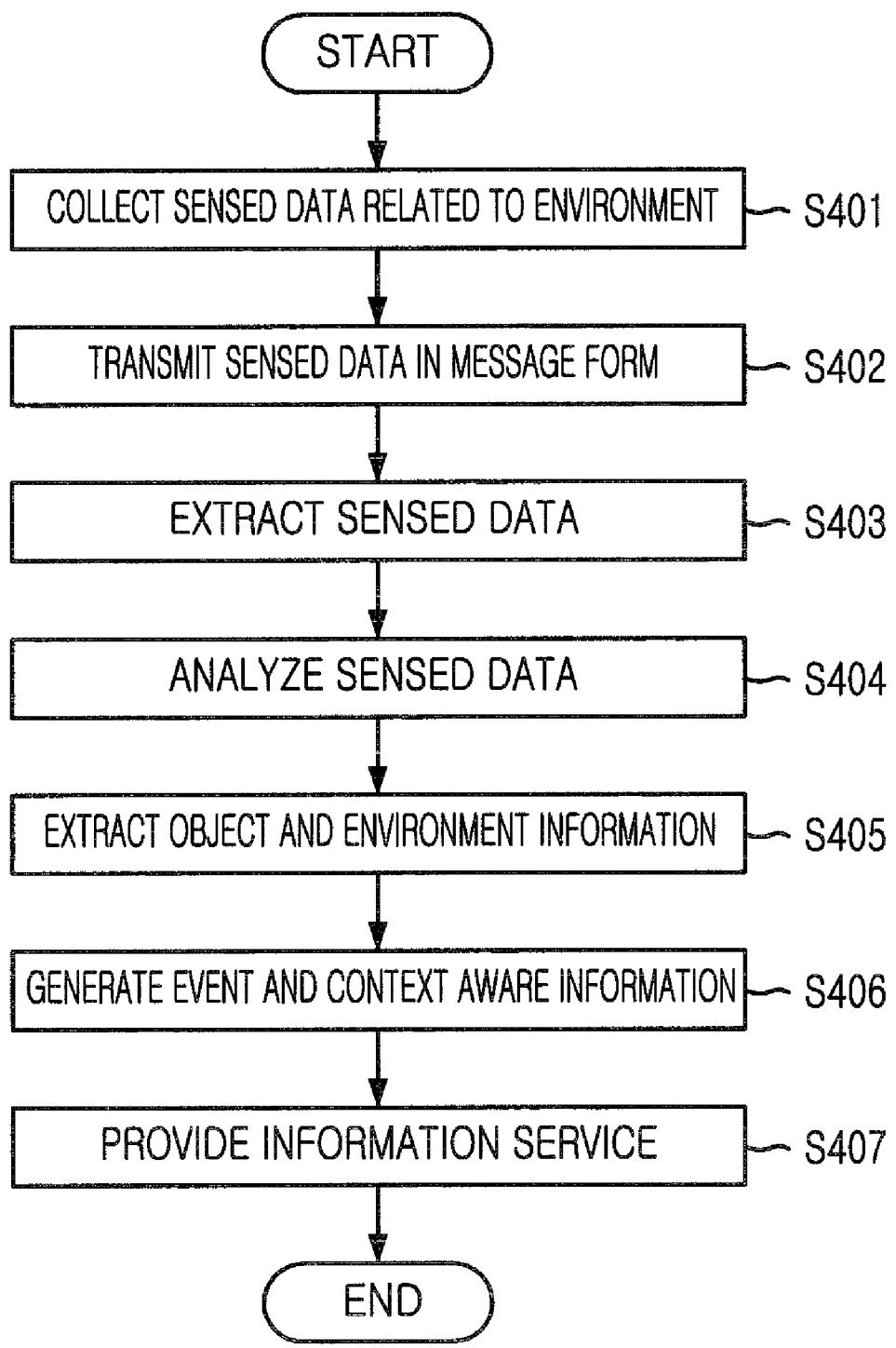
FIG. 4 is a flowchart describing a method for providing an information service based on sensed data transmitted from heterogeneous sensor networks in accordance with an embodiment of the present invention.

FIG. 4 is a flowchart illustrating a method for providing an information service based on sensed data transmitted from heterogeneous sensor networks in accordance with an embodiment of the present invention.

Referring to FIG. 4, each of the sensor nodes 10 of the sensor network 20 senses the sensed data related to the environment in step S401. In step S402, the sensor network 20 transmits the sensed data sensed by the sensor node 10 through the gateway 30 to the USN middleware apparatus 41 in a message form.

The USN middleware apparatus 40 extracts the operation state of the sensor network 20 and the sensed data from the message received from the sensor network 20 in step S403, performs an analysis operation to clean, classify and integrate the extracted sensed data in step S404, extracts the object and environment information S405, and generates the events, i.e., notification and alarm about a certain condition, and the context aware information, according to the rule set by the application program 50 in step S406.

The USN middleware apparatus 40 provides the information, i.e., the events and the context aware information, to the application program 50 in a form suitable for the application program.

Through these procedures, the USN middleware apparatus 40 analyzes and processes the information desired by the application program 50 from the sensed data collected by the sensor network 20 and then provides the processed information to the application program 50.

FIG. 5 is a flowchart illustrating a method for operating the USN middleware apparatus in accordance with an embodiment of the present invention.

Referring to FIG. 5, in step S501, the sensor network monitor 413 of the sensor network abstraction unit 41 performs a monitoring operation for a state management of the sensor network based on the sensed data extracted through the sensor network interface 411.

In step S502, the sensed data analyzer 421 of the sensor network intelligence unit 42 performs an analysis operation to clean, classify and integrate the sensed data processed by the sensor network abstraction unit 41. In step S503, the context information manager 423 of the sensor network intelligence unit 42 extracts object and environment information from the sensed data analyzed by the sensed data analyzer 421, and generates the context aware information, i.e., situation recognition information, based on the extracted object and environment information as well as the as the context rule in store which are related with the object and environment. In step S504, the event processor 422 of the sensor network intelligence unit 42 generates the events, i.e., notification and alarm about a certain condition, according to the rule set by the application program 50.

In step S505, the service process manager 432 of the service platform management unit 43 schedules the operation order for providing the information to the application program 50 and provides the results processed based on the scheduled sequence by the sensor network monitor 413, the sensed data analyzer 421, the event processor 422, and the context information manager 423 through the application program interface 433 to the application program 50.

The methods in accordance with the embodiments of the present invention can be realized as programs and stored in a computer-readable recording medium that can execute the programs. Examples of the computer-readable recording medium include CD-ROM, RAM, ROM, floppy disks, hard disks, magneto-optical disks and the like.

The present application contains subject matter related to Korean patent application No. 2006-0084353, filed with the Korean Intellectual Property Office on Sep. 1, 2006, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A system for providing an information service based on heterogeneous sensor networks, comprising:
   a sensor node constructing a sensor network to sense environment information;
   a sensor network data transmitter for collecting sensed data sensed by the sensor in real-time and transmitting the collected sensed data in a message form; and
   a Ubiquitous Sensor Network (USN) middleware for extracting object and environment information by cleaning, classifying and integrating the message received from the sensor network data transmitter, generating conditional events, context aware information, and knowledge contents from the extracted object and environment information, and providing the information service to an application program, the application program providing a user with information related to environment where the sensor network is installed.

2. The system as recited in claim 1, wherein the ubiquitous sensor network middleware comprises:
   a sensor network abstraction unit for extracting the sensed data from the message received from the sensor network data transmitter;
   a sensor network intelligence unit for extracting the object and environment information by analyzing the sensed data extracted by the sensor network abstraction unit, and generating the conditional events including notification and alarm about a certain condition, and the context aware information from the extracted object and environment information; and
   a service platform management unit for providing the events and the context aware information to the application program in a form suitable for the application program.

3. The system as recited in claim 2, wherein the sensor network abstraction unit comprises:
   a sensor network interface for extracting the sensed data by referring to a message transfer protocol;
   a sensor network interface protocol storage for managing a rule for the message transfer protocol; and a sensor network monitor for monitoring a state of the sensor network, based on the data received from the sensor network interface.

4. The system as recited in claim 3, wherein the sensor network intelligence unit comprises:
- a sensed data analyzer for performing an analysis operation to clean, classify and integrate the sensed data processed by the sensor network abstraction unit;
- an event processor for generating the conditional events including notification and alarm according to a rule set by the application program and managing the generated events; and
- a context information manager for sensing and generating the context aware information, based on the sensed data analyzed by the sensed data analyzer.

5. The system as recited in claim 4, wherein the service platform management unit comprises:
- a directory service manager for identifying and searching resources of the sensor network;
- a service process manager for scheduling and managing an operation sequence of the sensed data analyzer, the event processor, the context information manager, and the directory service manager in order to obtain a desired information service according to the application program; and
- an application program interface for providing the application program with the results processed by the sensor network monitor, the sensed data analyzer, the event processor, the context information manager, and the directory service manager in an information service form suitable for the application program.

6. A Ubiquitous Sensor Network (USN) middleware apparatus for generating an information service based on heterogeneous sensor networks, comprising:
- a sensor network abstraction unit for extracting sensed data from a message received from a sensor network;
- a sensor network intelligence unit for extracting object and environment information by performing an analysis operation to clean, classify and integrate the sensed data extracted by the sensor network abstraction unit, and generating an event, including notification and alarm, and context aware information from the extracted object and environment information; and
- a service platform management unit for providing the event and the context aware information to the application program in a form suitable for the application program.

7. The ubiquitous sensor network middleware apparatus as recited in claim 6, wherein the sensor network abstraction unit comprises:
- a sensor network interface for extracting the sensed data by referring to a message transfer protocol;
- a sensor network interface protocol storage for managing a rule for the message transfer protocol; and
- a sensor network monitor for monitoring a state of the sensor network, based on the data received from the sensor network interface.

8. The ubiquitous sensor network middleware apparatus as recited in claim 7, wherein the sensor network intelligence unit comprises:
- a sensed data analyzer for performing an analysis operation to clean, classify and integrate the sensed data processed by the sensor network abstraction unit;
- an event processor for generating the event including the knowledge contents according to a rule set by the application program and managing the generated event; and
- a context information manager for sensing and generating the environment condition information, based on the sensed data analyzed by the sensed data analyzer.

9. The ubiquitous sensor network middleware apparatus as recited in claim 8, wherein the service platform management unit comprises:
- a directory service manager for identifying and searching resources of the sensor network;
- a service process manager for scheduling and managing an operation order of the sensed data analyzer, the event processor, the context information manager, and the directory service manager in order to obtain a desired information service according to the application program; and
- an application program interface for providing the application program with the results processed by the sensor network monitor, the sensed data analyzer, the event processor, the context information manager, and the directory service manager in an information service form suitable for the application program.

10. A method for generating an information service based on heterogeneous sensor networks in a ubiquitous sensor network middleware apparatus, comprising:
- extracting sensed data and monitoring a state management of a sensor network, based on the extracted sensed data;
- performing an analysis operation to clean, classify and integrate the extracted sensed data;
- extracting object and environment information from the analyzed sensed data, and generating context aware information based on the extracted object and environment information;
- generating an event including notification event, alarm, and knowledge contents according to a rule set by an application program;
- scheduling an operation sequence for providing an information service to the application program; and
- providing the application program with the information service obtained according to the scheduled operation sequence, the information service including events and context aware information.

11. The method as recited in claim 10, wherein the performing an analysis operation to clean, classify and integrate the extracted sensed data analyzes sensed data from a specific single sensor network, or analyzes sensed data from a plurality of sensor networks, or analyzes sensed data from the sensor network in association with predefined legacy data.

12. The method as recited in claim 10, wherein the providing the application program with the information service obtained according to the scheduled operation sequence, the information service including events and context aware information provides the information service to the application program only one time, or periodically provides the information service during a request period of the application program, or provides the information service at a specific time point when a requirement from the application program is satisfied.

* * * * *